(12) United States Patent
Park et al.

(10) Patent No.: US 9,609,431 B2
(45) Date of Patent: Mar. 28, 2017

(54) INTERESTED AUDIO SOURCE CANCELLATION METHOD AND VOICE RECOGNITION METHOD AND VOICE RECOGNITION APPARATUS THEREOF

(71) Applicant: INDUSTRY-UNIVERSITY COOPERATION FOUNDATION SOGANG UNIVERSITY, Seoul (KR)

(72) Inventors: Hyung Min Park, Hwaseong-si (KR); Myung Woo Oh, Seoul (KR)

(73) Assignee: INDUSTRY-UNIVERSITY COOPERATION FOUNDATION SOGANG UNIVERSITY, Seoul (KR)

(*) Notice: Subject to any disclaimer, the term of this patent is extended or adjusted under 35 U.S.C. 154(b) by 346 days.

(21) Appl. No.: 14/365,720

(22) PCT Filed: Dec. 17, 2012

(86) PCT No.: PCT/KR2012/011018
§ 371 (c)(1),
(2) Date: Jun. 16, 2014

(87) PCT Pub. No.: WO2013/089536
PCT Pub. Date: Jun. 20, 2013

(65) Prior Publication Data
US 2014/0355776 A1 Dec. 4, 2014

(30) Foreign Application Priority Data
Dec. 16, 2011 (KR) .................. 10-2011-0136285

(51) Int. Cl.
*G10K 11/16* (2006.01)
*H04R 3/02* (2006.01)
(Continued)

(52) U.S. Cl.
CPC ............ *H04R 3/02* (2013.01); *G10L 21/0208* (2013.01); *G10L 21/0272* (2013.01);
(Continued)

(58) Field of Classification Search
CPC ........ H04R 1/1083; H04R 3/005; H04R 3/02; H04R 2410/01; H04R 2410/03; H04R 2410/05; G10K 11/175
(Continued)

(56) References Cited

U.S. PATENT DOCUMENTS 8,606,571 B1* 12/2013 Every ................. G10L 21/0232
375/285
8,958,572 B1* 2/2015 Solbach ............... H04R 1/1083
381/92

(Continued)

FOREIGN PATENT DOCUMENTS

JP 2003271191 9/2003
KR 1020110089782 8/2011

OTHER PUBLICATIONS

International Search Report—PCT/KR2012/011018 dated Mar. 20, 2013.
(Continued)

*Primary Examiner* — Md S Elahee
*Assistant Examiner* — Sabrina Diaz
(74) *Attorney, Agent, or Firm* — Cantor Colburn LLP

(57) ABSTRACT

Provided are an interested audio source cancellation method, a voice recognition method using the interested audio source cancellation method, computer-readable recording media recording programs for implementing the methods, and a voice recognition apparatus for performing voice recognition by using the interested audio source cancellation method. The interested audio source cancellation method includes steps of: receiving input mixed signals from two
(Continued)

microphones and transforming the signals into a time-frequency domain through short-term Fourier transformation; setting an interested audio source cancellation vector for cancelling an interested audio source signal from the input mixed signals in the time-frequency domain; and generating a mixed noise signal by cancelling the interested audio source signal from the input mixed signals by using the interested audio source cancellation vector.

17 Claims, 8 Drawing Sheets

(51) Int. Cl.
  *G10L 21/0208* (2013.01)
  *G10L 21/0272* (2013.01)
  *H04R 3/00* (2006.01)
  *G10L 15/20* (2006.01)
(52) U.S. Cl.
  CPC .............. *H04R 3/005* (2013.01); *G10L 15/20* (2013.01); *H04R 2410/03* (2013.01)
(58) Field of Classification Search
  USPC ............... 381/73.1, 71.1, 71.14, 71.12, 94.1; 704/200, 226–228, 231, 233
  See application file for complete search history.

(56) References Cited

U.S. PATENT DOCUMENTS

2003/0177006 A1   9/2003   Ichikawa et al.
2003/0177007 A1   9/2003   Kanazawa et al.

OTHER PUBLICATIONS

Aapo Hyvarinen, Fast and Robust Fixed-Point Algorithms for Independent Component Analysis, IEEE Transactions on Neural Networks, 1999, pp. 626-634.

Ella Bingham et al., A Fast Fixed-Point Algorithm for Independent Component Analysis of Complex Valued Signals, International Journal of Neural Systems, 2000, pp. 1-8.

Intae Lee et al., Fast fixed-point independent vector analysis algorithms for convolutive blind source separation, Signal Processing, 2007, pp. 1859-1871.

Myungwoo Oh et al., Blind source separation based on independent vector analysis using feed-forward network, Neurocomputer, 2011, pp. 3713-3715.

* cited by examiner

Figure 8

| (dB) | $SNR_g = 0dB$ | | $SNR_g = 5dB$ | | $SNR_g = 10dB$ | | $SNR_g = 20dB$ | |
|---|---|---|---|---|---|---|---|---|
| | $SNR_{ad}$ | $SNR_{ad} - SNR_g$ | $SNR_{ad}$ | $SNR_{ad} - SNR_g$ | $SNR_{ad}$ | $SNR_{ad} - SNR_g$ | $SNR_{ad}$ | $SNR_{ad} - SNR_g$ |
| RT60=0.1s | -11.67 | -11.67 | -9.86 | -14.86 | -2.37 | -12.37 | -0.43 | -20.43 |
| RT60=0.3s | -6.17 | -6.17 | -1.92 | -6.92 | 3.05 | -6.95 | 14.34 | -5.66 |
| RT60=0.5s | -3.51 | -3.51 | 1.08 | -3.92 | 6.12 | -3.88 | 17.03 | -2.97 |

Figure 9

| (%) | $SNR_g = 0dB$ | | $SNR_g = 5dB$ | | $SNR_g = 10dB$ | | $SNR_g = 20dB$ | |
|---|---|---|---|---|---|---|---|---|
| | Baseline | Proposed | Baseline | Proposed | Baseline | Proposed | Baseline | Proposed |
| RT60=0.1s | 5.26 | 15.38 | 18.43 | 43.97 | 52.71 | 70.64 | 89.69 | 93.44 |
| RT60=0.3s | 4.75 | 9.81 | 13.86 | 29.32 | 42.37 | 58.65 | 84.38 | 88.60 |
| RT60=0.5s | 5.02 | 7.38 | 8.24 | 17.69 | 25.50 | 40.73 | 67.04 | 75.75 | ial
INTERESTED AUDIO SOURCE CANCELLATION METHOD AND VOICE RECOGNITION METHOD AND VOICE RECOGNITION APPARATUS THEREOF

TECHNICAL FIELD

The present invention relates to an interested audio source cancellation technique, and more particularly, to an interested audio source cancellation method of estimating a mixed noise signal by cancelling only an interested audio source signal from a mixed signal supplied by two or more microphones installed in an environment where audio signals from a plurality of audio sources are mixed and a voice recognition method and a voice recognition apparatus using the same.

BACKGROUND ART

A blind source separation technique is to separate an interested audio source signal from a mixed signal picked up by two or more microphones.

Now, the related art of the blind source separation technique will be described.

[Independent Component Analysis Based on Non-Gaussianity]

First, an independent component analysis method based on non-gaussianity is described.

In general, the independent component analysis can be explained by using the following model.

$$x = As \quad \text{[Mathematical Formula 1]}$$

$$y = \hat{S} = Wx = WAs \approx A^{-1}As \quad \text{[Mathematical Formula 2]}$$

In the mathematical formulas 1 and 2, y is an output vector of the independent component analysis, x is an input vector of a microphone, and s is a vector for a to-be-found audio source.

The independent component analysis has a problem in that, in the state where a mixing matrix A representing a course of mixing of an audio source signal up to the time when the audio source signal enters the microphone is unknown, a pseudo-inverse matrix W thereof is to be found.

The above-described problem of the independent component analysis can be solved by measuring non-gaussianity based on the central limit theorem according to Aapo Hyvarinen, "Fast and robust fixed-point algorithms for independent component analysis", IEEE Trans. on Neural Networks, vol. 10, no. 3, 1999. Namely, when there exists a noise signal where independent interested audio source signals are mixed, since the mixed noise signal is a superposition of plural independent noise signals, the mixed noise signal is closer to a Gaussian distribution than the independent interested audio source signals. Therefore, individual independent components can be separated by maximizing non-gaussianity of the output signal.

FIG. 1 illustrates a histogram of an audio source signal spoken by one person and a histogram of a babble noise, that is, voices clamorously spoken by many people, and a mixed noise signal is closer to a gaussian distribution that an independent interested audio source.

[Independent Component Analysis Method Based on Negentropy Maximization]

In order to measure the non-gaussianity of the output signal $y_i$, the definition of the negentropy expressed by Mathematical Formula 3 is used.

$$J(y_i) = H(y_i^{gauss}) - Y(y_i) \quad \text{[Mathematical Formula 3]}$$

Herein, $y_i^{gauss}$ is a gaussian distribution random variable having the same variance as that of $y_i$. The entropy H of the random variable $y_i$ of which probability density function is $p_{y_i}$ is expressed by Mathematical Formula 4.

$$H(y_i) = -\int p_{y_i}(u) \log p_{y_i}(u) du \quad \text{[Mathematical Formula 4]}$$

Since a random variable having the highest entropy among the random variables having the same variance is a gaussian distribution random variable, the non-gaussianity with respect to an estimated output signal $y_i$ can be maximized by maximizing the negentropy, and the estimated output signal $y_i$ is approximated to the original audio source signal according to the central limit theorem. Since the direct calculation of the aforementioned negentropy is very complicated, the negentropy can be approximated with respect to a random variable having a symmetric distribution as expressed by Mathematical Formula 5.

$$J(y_i) \propto [E\{G(y_i)\} - E\{G(y_i^{gauss})\}]^2$$

This approximation method is a generalization of a high-dimensional superposition approximation method and utilizes an expectation value of a nonquadratic nonlinear function G of the output signal $y_i$. The nonlinear function G is approximated to $G(y) = y^4$ in the case where it is based on kurtosis. Besides the nonlinear function based on the kurtosis, effective nonlinear functions exist as follows.

$$G_1(y) = \frac{1}{a_1} \log \cosh a_1 y \quad \text{[Mathematical Formula 6]}$$

$$G2(y) = -\exp(-y^2/2) \quad \text{[Mathematical Formula 7]}$$

In the Mathematical Formulas 6 and 7, it is assumed that the output signal y has an average of 0 and a variance of 1. At this time, if X is whitened, the average thereof becomes 0, and the correlation matrix becomes an identity matrix. Therefore, Y having an average of 0 and variance of 1 can be estimated through transformation into a unitary matrix, and a simple transform matrix training formula can be described by using characteristics of the unitary matrix. When a whitening transformation matrix is denoted by V, a whitening output z with respect to the input signal x is expressed by Mathematical Formula 8.

$$z = Vx = D^{-1/2}E^T x \quad \text{[Mathematical Formula 8]}$$

In the above Mathematical Formula 8, $D = \text{diag}(d \ldots d_n)$ denotes a diagonal matrix of eigenvalues of an input covariance matrix; and E denotes a matrix of eigenvectors of the input covariance matrix.

The negentropy is expressed by the following Mathematical Formula 9 by using a random variable z which is whitened according to the aforementioned Mathematical Formula 8.

$$J_G(W) = [\{G(w^T z) - E(G(v))\}]^2 \quad \text{[Mathematical Formula 9]}$$

In the above Mathematical Formula 9, w denotes a vector having a norm of 1; and v denotes a gaussian distribution random variable having an average of 0 and a variance of 1. Since $E\{G(w^T z)\}$ is always smaller than $E\{G(v)\}$, the maximization of negentropy is equivalent to the minimization of $E\{G(w^T z)\}$. In order to maximize the negentropy, an algorithm of a steepest ascent method with respect to w can be derived. Therefore, the algorithm has a training rule according to Mathematical Formula 10 and Mathematical Formula 11.

$$\Delta w \propto \gamma E\{zg(w^T z)\} \quad \text{[Mathematical Formula 10]}$$

$$w \leftarrow w/\|w\| \quad \text{[Mathematical Formula 11]}$$

Herein, $y = E\{G(w^T z)\} - E\{G(v)\}$.

In the differentiation process, $E\{G(v)\}$ disappears because the value of the term of the gaussian distribution random variable having an average of 0 and a variance of 1 is fixed with respect to the w having a norm of 1. Since the sign of $\gamma$ has an effect on a stability in the training process, the algorithm can be more simplified by fixing the sign. In particular, the sign of $\gamma$ can be defined according to transcendental information of independent components. For example, in the case of an audio signal, since the audio signal has a super-gaussian distribution, when g(E) is tan h(E), an audio source signal can be found by fixing $\gamma$ to $-1$. Therefore, instead of maximizing the negentropy, a specific audio source signal can be recovered by minimizing $E\{G(w^T z)\}$.

Since the methods in the related art require an analysis in a frequency plane, the separation vector w, the input signal, and the output signal are complex numbers. If a cost function is a complex function, the amplitude of the function cannot be defined, and thus, it is impossible to minimize the cost function. Therefore, the cost function with respect to w is expressed in a form of a square of absolute value of $w^H z$ as follows.

$$J_G'(W) = E\{G(|w^H z|^2)\} \quad \text{[Mathematical Formula 12]}$$

Herein, G is expressed by using the following functions which are different from G in a real number plane.

$$G_1(y) = \sqrt{a_1 + y} \quad \text{[Mathematical Formula 13]}$$

$$G_2(y) = \log(a_2 + y) \quad \text{[Mathematical Formula 14]}$$

$$G_2(y) = \frac{1}{2}y^2 \quad \text{[Mathematical Formula 15]}$$

The algorithm of the steepest ascent method with respect to w can be derived by differentiating the cost function. Therefore, the algorithm has a training rule according to Mathematical Formula 16 and Mathematical Formula 17.

$$\Delta w \propto -E\{zg(w^H z)^* g(|w^H z|^2)\} \quad \text{[Mathematical Formula 16]}$$

$$w \leftarrow w/\|w\| \quad \text{[Mathematical Formula 17]}$$

[Independent Component Analysis Method Based on Negentropy Maximization Using Independent Vector Analysis]

The independent vector analysis algorithm is a concept extension of the independent component analysis to multivariate components in a frequency plane. The independent vector analysis can be considered to be a problem of an independent component analysis in the case where all of intrinsic independent components and observed signals are multivariate signals, that is, vector signals.

In an independent vector analysis model, it is assumed that signal source vectors are independent of each other in terms of probability, and it is assumed that components of each signal source vector are not independent of each other but correlated with each other in terms of probability.

When these assumptions are applied to the algorithm to the frequency plane, it can be expressed that each signal source vector corresponds to a vector in a frequency axis, and the components of a vector, that is, the components of frequency have correlation with each other.

FIG. 2 is a schematic diagram illustrating a comparison between the frequency plane independent component analysis and the independent vector analysis with respect to a two-channel input/output frequency signal.

In the above-described independent component analysis, the nonlinear function G included in the cost function receives a multivariate vector of the frequency axis as a parameter, and thus, the cost function with respect to the changed w is expressed by Mathematical Formula 18.

$$J_G''(w(k)) = E\left\{G\left(\sum_k |(w(k))^H z(k, \tau)|^2\right)\right\} \quad \text{[Mathematical Formula 18]}$$

In the above Mathematical Formula 18, k and $\tau$ denote a frequency index and a time frame index. According to the Mathematical Formula 18, it can be understood that parameters of the nonlinear function G are changed into multivariate vectors through the independent vector analysis. By differentiating, a steepest ascent method algorithm with respect to w(k) can be derived. Accordingly, the algorithm has training rules as expressed by Mathematical Formulas 19 and 20.

$$\Delta w(k) \propto -E\left\{z(k, \tau)[(w(k))^H z(k, \tau)]^* g\left(\sum_k |(w(k))^H z(k, \tau)|^2\right)\right\} \quad \text{[Mathematical Formula 19]}$$

$$w(k) \leftarrow w(k)/\|w(k)\| \quad \text{[Mathematical Formula 20]}$$

[Interested Audio Source Separation Algorithm]

Although the interested audio source can be effectively estimated by maximizing the negentropy of the output signal through the above-described interested audio source separation algorithm of the related art, theoretically, as many number of microphone inputs as the number of mixed audio sources need to exist in order to perform the above-described estimation.

However, in real environment, it is impossible to prepare as many number of microphones as the number of mixed audio source, and even through the microphones are prepared, there is a problem in that the number of to-be-estimated parameters becomes large.

As the related art of the above-described audio source separation, there are "Fast and robust fixed-point algorithms for independent component analysis", by Aapo Hyvarinen, IEEE Trans. on Neural Networks, vol. 10, no. 3, 1999, "A fast fixed-point algorithm for independent component analysis of complex valued signals", by E. Bingham and A. Hyvarinen, International Journal of Neural Systems, vol. 10, no. 1, 2000, "Fast fixed-point independent vector analysis algorithms for convolutive blind source separation", by I. Lee, T. Kim, and T. Lee, Signal Processing, vol. 87, Issue 8, 2007, and so on.

DISCLOSURE

Technical Problem

The present invention is to provide an interested audio source cancellation method capable of estimating a mixed noise signal by cancelling an interested audio source from mixed signals supplied from two microphones installed in an environment where audio signals from a number of audio sources are mixed.

The present invention is also to provide a computer-readable recording medium recording a program for implementing the aforementioned interested audio source cancellation method.

The present invention is also to provide a voice recognition method of estimating a mixed noise signal by cancelling an interested audio source from mixed signals supplied from two microphones installed in an environment where audio signals from a number of audio sources are mixed, identifying a noise-signal dominant domain from the mixed signals by comparing the estimated noise signal with the mixed signal supplied from the microphones, and recovering feature values by applying a loss feature recovering technique to the domain.

The present invention is also to provide a computer-readable recording medium recording a program for implementing the aforementioned voice recognition method.

The present invention is also to provide a voice recognition apparatus which estimates a mixed noise signal by cancelling an interested audio source from mixed signals supplied from two microphones installed in an environment where audio signals from a number of audio sources are mixed, identifies a noise-signal dominant domain from the mixed signals by comparing the estimated noise signal with the mixed signal supplied from the microphones, and recovers feature values by applying a loss feature recovering technique to the domain.

Technical Solution

According to a first aspect of the present invention, there is provided an interested audio source cancellation method including steps of: receiving input mixed signals from two microphones and transforming the signals into a time-frequency domain through short-term Fourier transformation; setting a vector for cancelling an interested audio source signal from the input mixed signals in the time-frequency domain; and generating a mixed noise signal by cancelling the interested audio source signal from the input mixed signals by using the interested audio source cancellation vector.

According to a second aspect of the present invention, there is provided a voice recognition method using signals input from two microphones includes steps of: (a) generating a noise signal by using input mixed signals supplied from two microphones and generating a binary mask according to energy ratios between the noise signal and the input mixed signals; (b) recovering loss features with respect to an interested audio source by using the binary mask and the input mixed signals; and (c) performing voice recognition by using a result of the recovering of the loss features with respect to the interested audio source.

In the voice recognition method according to the above second aspect, preferably, the step (a) includes steps of: (a1) receiving the input mixed signals from the two microphones and transforming the signals into a time-frequency domain through short-term Fourier transformation; (a2) setting a vector for cancelling an interested audio source signal from the input mixed signals in the time-frequency domain; (a3) generating a mixed noise signal by cancelling the interested audio source signal from the input mixed signals by using the interested audio source cancellation vector; and (a4) generating the binary mask according to the energy ratios between the mixed noise signal and the input mixed signals.

According to a third aspect of the present invention, there is provided a computer-readable recording medium recording a program for cancelling an interested audio source from signals input from two microphones by executing steps of: receiving input mixed signals from the two microphones and transforming the signals into a time-frequency domain through short-term Fourier transformation; setting a vector for cancelling an interested audio source signal from the input mixed signals in the time-frequency domain; and generating a mixed noise signal by cancelling the interested audio source signal from the input mixed signals by using the interested audio source cancellation vector.

According to a fourth aspect of the present invention, there is provided a computer-readable recording medium recording a program for recognizing voice from signals input from two microphones by executing steps of: receiving input mixed signals from the two microphones and transforming the signals into a time-frequency domain through short-term Fourier transformation; setting a vector for cancelling an interested audio source signal from the input mixed signals in the time-frequency domain; generating a mixed noise signal by cancelling the interested audio source signal from the input mixed signals by using the interested audio source cancellation vector; and generating a binary mask according to energy ratios between the mixed noise signal and the input mixed signals; recovering loss features with respect to the interested audio source by using the binary mask and the input mixed signals; and performing voice recognition by using a result of the recovering of the loss features with respect to the interested audio source.

According to a fifth aspect of the present invention, there is provided a voice recognition apparatus for performing voice recognition from signals input from two microphones, including: a signal input unit which receives input signals from the two microphones; a mask generation unit which is supplied with input mixed signals from the signal input unit, generates a noise signal from the input mixed signals, and generates a binary mask according to energy ratios between the noise signal and the mixed signals; a loss feature recovering unit which recovers loss features with respect to an interested audio source by using the binary mask generated by the mask generation unit and the input mixed signals; and a voice recognition unit which performs voice recognition by using a result of the recovering of the loss features with respect to the interested audio source through the loss feature recovering unit.

In the voice recognition apparatus according to the above fifth aspect, preferably, the mask generation unit is configured to include: an interested audio source cancellation vector generation module which receives the input mixed signals from the signal input unit to transform the signals into a time-frequency domain through short-term Fourier transformation and sets a vector for cancelling an interested audio source signal from the input mixed signals in the time-frequency domain; and a noise signal generation module which generates a mixed noise signal by cancelling the interested audio source signal from the input mixed signals by using the interested audio source cancellation vector set by the interested audio source cancellation vector generation module; and a mask generation module which generates the binary mask according to the energy ratios between the mixed noise signal generated by the noise signal generation module and the input mixed signals.

Advantageous Effects

According to an interested audio source cancellation method of the present invention, it is possible to effectively estimate a mixed noise signal by cancelling an interested audio source from mixed signals supplied from two microphones installed in an environment where audio signals from a number of audio sources are mixed.

In addition, according to a voice recognition method and a voice recognition apparatus of the present invention, it is possible to improve a voice recognition rate during voice recognition by estimating a mixed noise signal by cancelling an interested audio source from mixed signals supplied from two microphones installed in an environment where audio signals from a number of audio sources are mixed, identifying a noise-signal dominant domain from the mixed signals by comparing the estimated noise signal with the mixed signal supplied from the microphones, and recovering feature values by applying a loss feature recovering technique to the domain.

BRIEF DESCRIPTION OF DRAWINGS

FIG. 8 is a table listing results of signal-to-noise ratios of output signals of interested audio source cancellation with respect to signal-to-noise ratios of various input signals and reverberation times.

FIG. 9 is a table listing results of voice recognition with respect to signal-to-noise ratios of various input signals and reverberation times.

BEST MODE

The present invention is to estimate a mixed noise signal by cancelling an interested audio source from mixed signals supplied from two microphones installed in an environment where audio signals from a number of audio sources are mixed.

In addition, the present invention obtains an effect of improving a voice recognition rate during voice recognition by estimating a mixed noise signal by cancelling an interested audio source from mixed signals supplied from two microphones installed in an environment where audio signals from a number of audio sources are mixed, identifying a noise-signal dominant domain from the mixed signals by comparing the estimated noise signal with the mixed signal supplied from the microphones, and recovering feature values by applying a loss feature recovering technique to the domain.

[Interested Audio Source Cancellation]

Figure 1:
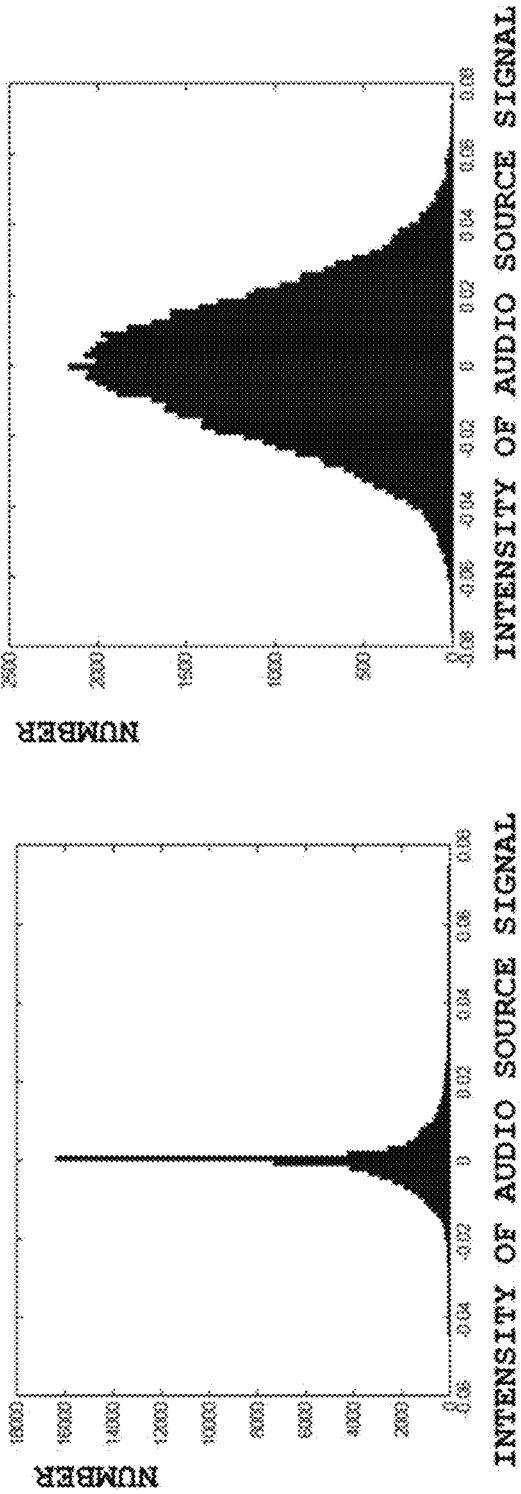
FIG. 1 is a diagram illustrating a histogram of an audio source which is spoken by one person and a histogram of a babble noise.
Figure 2:
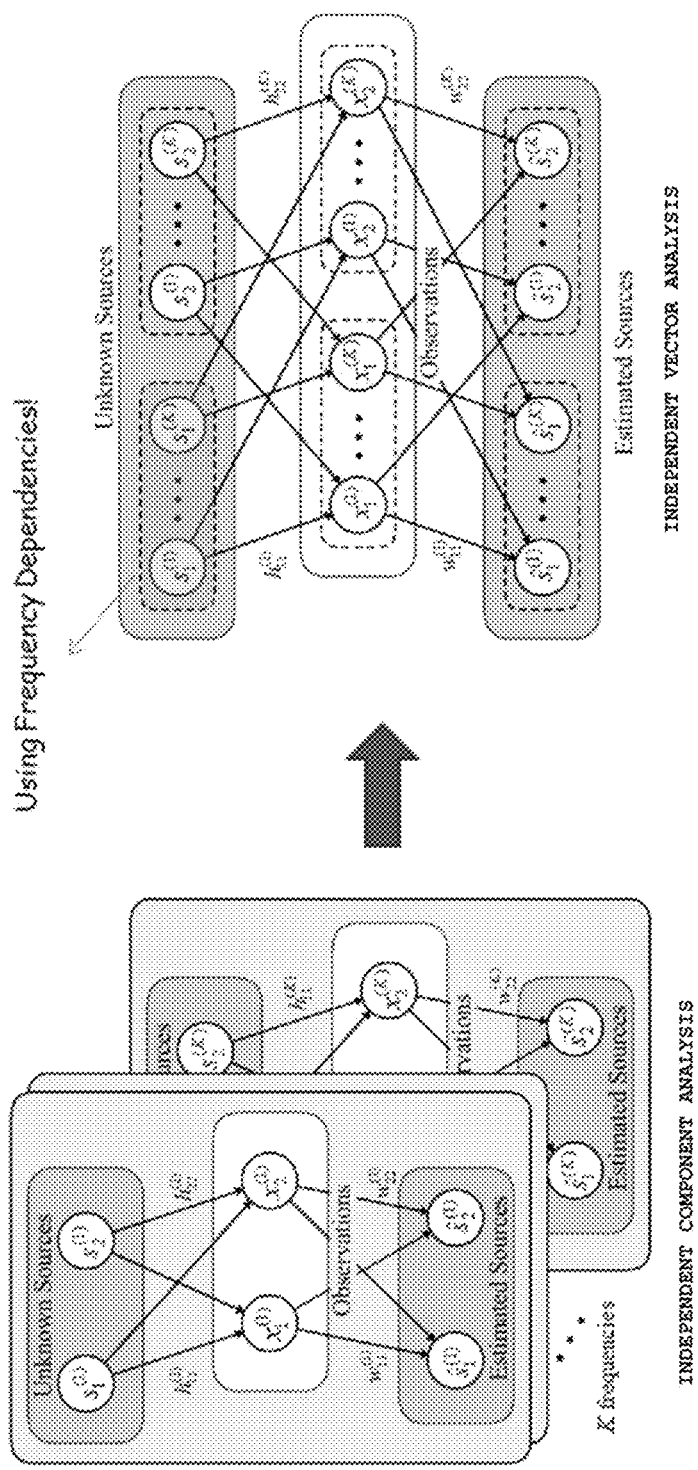
FIG. 2 is a schematic diagram illustrating difference between an independent component analysis and an independent vector analysis in a frequency domain.
Figure 3:
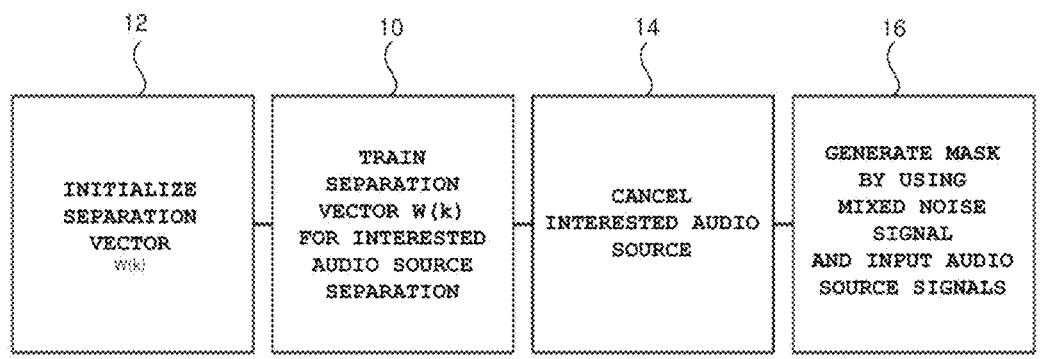
FIG. 3 is a flowchart illustrating an interested audio source cancellation method according to an exemplary embodiment of the present invention.

Processes of the interested audio source cancellation according to an exemplary embodiment of the present invention will be described with reference to FIG. 3.

In the interested audio source cancellation, the mixed noise signal is estimated by forming one null according to each frequency with respect to the mixed signals from the two microphones and cancelling only the interested audio source from the mixed signals.

First, a vector w(k) for cancelling an interested audio source signal from a mixed signal is trained (Step 10).

The process of training the vector w(k) will be described.

When it is assumed that a mixed noise signal is a mixture of several independent audio source signals, the mixed noise signal is considered to be closer to a gaussian distribution than the interested audio source signal due to the central limit theorem. In order to extract the only noise signal which is closer to the gaussian distribution in this manner, the negentropy needs to be minimized. In order to extract the only noise signal which is closer to the gaussian distribution in this manner, the negentropy needs to be minimized. Therefore, training is performed with the sign which is opposite to that in the interest audio source separation algorithm using the steepest ascent method.

The rule of training the vector w(k) is expressed by Mathematical Formulas 21 and 22.

[Mathematical Formula 21]
$$\Delta w(k) \propto E\left\{z(k,\tau)[(w(k))^H z(k,\tau)]^* g\left(\sum_k |(w(k))^H z(k,\tau)|^2\right)\right\}$$

[Mathematical Formula 22]
$$w(k) \leftarrow w(k)/\|w(k)\|$$

In the above Mathematical Formulas 21 and 22, w denotes a vector for cancelling an interested audio source signal; z denotes a whitened input vector; and k denotes a frequency index. In addition, g denotes a function obtained by differentiating a nonlinear function G.

[Vector Initialization Using DUET (Degenerate Unmixing Estimation Technique) Histogram]

Initialization of the vector w(k) is performed by using a DUET (Degenerate Unmixing Estimation Technique) histogram (Step 12).

In the DUET algorithm in which a reverberation environment is considered, the mixed signals input to two microphones can be expressed as follows.

[Mathematical Formula 23]
$$x_1(t) = \sum_{j=1}^{N} h_{1j}(t) * s_j(t)$$
$$x_2(t) = \sum_{j=1}^{N} h_{2j}(t) * s_j(t)$$

[Mathematical Formula 24]
$$\begin{bmatrix} X_1(k,\tau) \\ X_2(k,\tau) \end{bmatrix} = \begin{bmatrix} H_{11}(k) & \ldots & H_{1N}(k) \\ H_{21}(k) & \ldots & H_{2N}(k) \end{bmatrix} \begin{bmatrix} S_1(k,\tau) \\ \vdots \\ S_N(k,\tau) \end{bmatrix}$$
$$= \begin{bmatrix} 1 & \ldots & 1 \\ \frac{H_{21}(k)}{H_{11}(k)} & \ldots & \frac{H_{2N}(k)}{H_{1N}(k)} \end{bmatrix} \begin{bmatrix} S_1(k,\tau) \\ \vdots \\ S_N(k,\tau) \end{bmatrix}$$
$$= \begin{bmatrix} 1 & \ldots & 1 \\ a_1(k)e^{-i w_k \delta_1(k)} & \ldots & a_N(k)e^{-i w_k \delta_N(k)} \end{bmatrix} \begin{bmatrix} S_1(k,\tau) \\ \vdots \\ S_N(k,\tau) \end{bmatrix}$$

In the above Mathematical Formula 23, $x_1(t)$ and $x_2(t)$ denote input signals of the microphones; and $h_{ij}(t)$ denotes a channel filter between an audio source and each microphone. In the above Mathematical Formula 24, $x_1(k,\tau)$ and $x_2(k,\tau)$ denote time-frequency domain components of $x_1(t)$ and $x_2(t)$ obtained through short-term Fourier transformation; k and $\tau$ denote frequency and time frame indexes in the time-frequency domain; and $w_k$ denotes a normalized frequency in a k-th frequency domain. $H_{ij}(k)$ denotes a frequency domain components a frequency domain component of h obtained through Fourier transformation; and a and $\delta$ denote parameters relating to the audio source signals and represent a attenuation variable indicating a difference in intensity between first and second inputs of the microphone and a time delay variable indicating a difference in arrival delay time between the first and second inputs.

The DUET algorithm is based on a W-DO (W-Disjoint Orthogonality) assumption that at most one dominant audio source signal exists in the specific time-frequency domain.

According to the W-DO assumption, in the case where the interested audio source signal $S(k,\tau)$ is dominant in specific time and frequency $(k,\tau)$, Mathematical Formula 24 is approximated to Mathematical Formula 25.

$$\begin{bmatrix} X_1(k,\tau) \\ X_2(k,\tau) \end{bmatrix} \approx \begin{bmatrix} 1 \\ A(k) \end{bmatrix} S(k,\tau) \quad \text{[Mathematical Formula 25]}$$

In the above Mathematical Formula 25, $S(k,\tau)$ represents an interested audio source, $A(k)$ denotes a complex number $a(k)e^{-iw_k\delta(k,\tau)}$ obtained from parameters with respect to the interested audio source $S(k,\tau)$; $X_1(k,\tau)$ and $X_2(k,\tau)$ denote input values of the microphones in the time-frequency domain; and $w_k(k)$ denotes a normalized frequency in the k-th frequency domain.

The parameters a and $\delta$ with respect to the interested audio source signal at the time and frequency $(k,\tau)$ are estimated by the following mathematical formula.

$$(\hat{a}(k), \hat{\delta}(k)) \approx \left( \frac{|X_2(k,\tau)|}{|X_1(k,\tau)|}, \frac{1}{\omega_k} \operatorname{Im}\left\{ \ln\left( \frac{X_1(k,\tau)}{X_2(k,\tau)} \right) \right\} \right) \quad \text{[Mathematical Formula 26]}$$

In the above Mathematical Formula 26, $X_1(k,\tau)$ and $X_2(k,\tau)$ are input values of the microphones in the time-frequency domain, $\hat{a}(k)$ is an attenuation value of the interested audio source signal between the inputs of the microphones in the time-frequency domain, and $\hat{\delta}$ is a time delay value of the interested audio source signal between the inputs of the microphones in the time-frequency domain.

Figure 4:
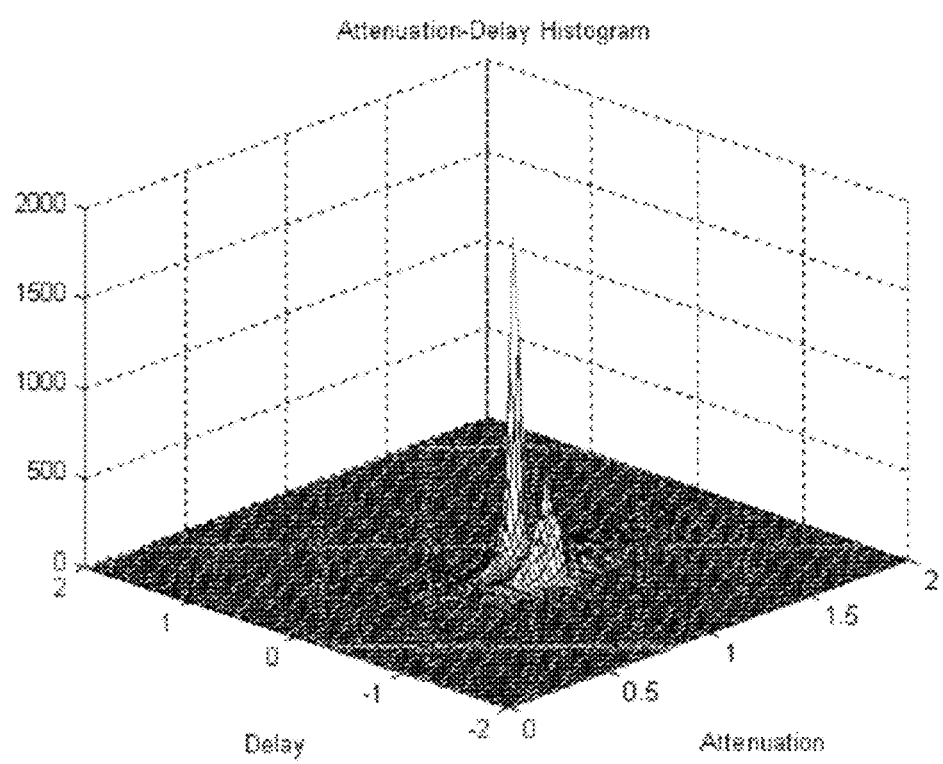
FIG. 4 is a diagram illustrating an attenuation-time delay histogram in a DUET algorithm.

Attenuation and time delay parameters are estimated at all time frames of a specific frequency through the right-handed side of Mathematical Formula 26 by using inputs of microphones where two audio source signals are mixed, and a histogram is generated by using the values thereof. Referring to FIG. 4 illustrating the histogram, two peaks corresponding to two audio sources are formed. If it is assumed that the interested audio source signal has overall dominant energy in comparison with other several noise source signals, the highest peak in the histogram corresponds to the parameters relating to the interested audio source signal.

Therefore, the attenuation and time delay parameters are estimated at all time frames of the specific frequency through the right-handed side of Mathematical Formula 26 and the histogram is generated by using the values thereof, and after that, the attenuation and time delay values corresponding to the highest peak are assumed to be parameters for the interested audio source. In the case where the number of time frames is not insufficient in the generation of the histogram according to each frequency, after a DUET histogram is two-dimensionally filtered through a two-dimensional gaussian window so as to be smoothened, the parameters corresponding to the peak are estimated.

Next, the vector $w(k)$ for the interested audio source cancellation can be minimized by taking a reciprocal of the complex number $A(k)=a(k)e^{-iw_k\delta(k,\tau)}$ obtained from the parameters with respect to the interested audio source as expressed in the following Mathematical Formula 27. Herein, $w_k(k)$ denotes a normalized frequency in the k-th frequency domain.

$$w(k) = \frac{1}{\sqrt{1+a^2(k)}} \begin{bmatrix} 1 \\ -A^{-1}(k) \end{bmatrix} \quad \text{[Mathematical Formula 27]}$$

[Interested Audio Source Cancellation]

A mixed noise signal is generated by cancelling the interested audio source signal from the input mixed signals based on the initialization and the vector $w(k)$ for the trained interested audio source cancellation above described (Step 14). Herein, the input mixed signals from the two microphones are transformed into the time-frequency domain through the short-term Fourier transformation, and after that, the interested audio source signal is cancelled by the vector $w(k)$, so that the mixed noise signal is generated.

[Mask Generation Using Mixed Noise Signal and Input Mixed Signal]

After the mixed noise signal is generated as described above, a mask is generated by comparing the mixed noise signal with the input mixed signal in the time-frequency domain (Step 16). The input mixed signal and the mixed noise signal are expressed in the time-frequency domain through the short-term Fourier transformation, and an output-to-input energy ratio (OIR) at each time-frequency $(k,\tau)$ is obtained by Mathematical Formula 28.

$$OIR(k,\tau) = \frac{|U(k,\tau)|^2}{|X_1(k,\tau)|^2} \quad \text{[Mathematical Formula 28]}$$

In the above Mathematical Formula 28, $OIR(k,\tau)$ denotes an output-to-input energy ratio at each time-frequency $(k,\tau)$; $X_1(k,\tau)$ denotes an input mixed signal; and $U(k,\tau)w^H(k)z(k,\tau)$ denotes an output signal obtained by cancelling an interested audio source component from the entire mixed signal.

Since a real output-to-input energy ratio is an energy ratio of the signal $U(k,\tau)$ where the interested audio source component is cancelled of the energy of the entire mixed signal $X_1(k,\tau)$, a large value thereof denotes that a small amount of the interested audio source component is included in $X_1(k,\tau)$, and a small value thereof denotes that a large amount of the interested audio source component is included.

Therefore, by calculating the output-to-input energy ratio at each time-frequency and setting appropriate threshold value θ(k), the binary makes can be configured as expressed by Mathematical Formula 29.

$$\Omega(k, \tau) = \begin{cases} 1, & OIR(k, \tau) \le \theta(k) \\ 0, & \text{othewise} \end{cases}$$ [Mathematical Formula 29]

In the above Mathematical Formula 29, Ω(k,τ) denotes a binary mask; OIR(k,τ) denotes an output-to-input energy ratio at each time-frequency (k,τ); and θ(k) denotes a threshold value which is arbitrarily set.

[Voice Recognition Process Using Input Mixed Signal and Binary Mask]

Figure 5:
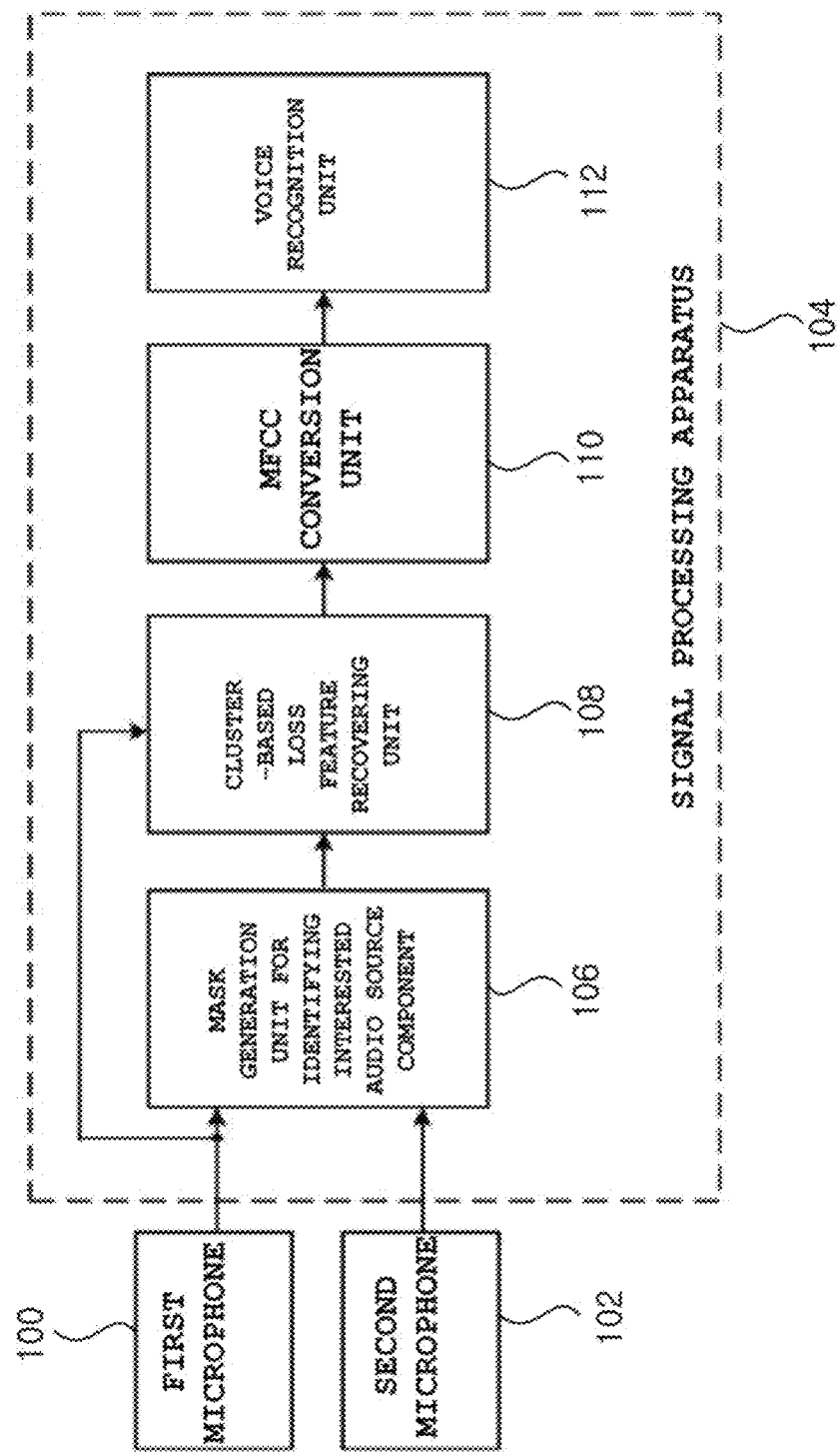
FIG. 5 is a diagram illustrating a configuration of a voice recognition apparatus according to an exemplary embodiment of the present invention.

A voice recognition process for an audio source signal obtained as described above will be described with reference to FIG. 5 which is a diagram illustrating a configuration of a voice recognition apparatus.

The voice recognition apparatus is configured to include first and second microphones 100 and 102 and a signal processing apparatus 104.

Each of the first and second microphones 100 and 102 receives a mixed signal as an input signal from a plurality of audio sources in the state that the microphone is separated by a predetermined distance and supplies the mixed signal as an input signal to the signal processing apparatus 104.

The signal processing apparatus 104 is configured to include a mask generation unit 106 for identifying an interested audio source component, a cluster-based loss feature recovering unit 108, an MFCC conversion unit 110, and a voice recognition unit 112.

The mask generation unit 106 for identifying the interested audio source component is configured to include an interested audio source cancellation vector generation module, a noise signal generation module, and a mask generation module, and the mask generation unit 106 generates a mixed noise signal by cancelling the interested audio source component from the input signals input from the first and second microphones 100 and 102 and generates a binary mask according to an energy ratio between the mixed noise signal and the input signals.

The interested audio source cancellation vector generation module receives the input mixed signal from the signal input unit, transforms the input mixed signals into a time-frequency domain through short-term Fourier transformation, sets a vector for cancelling an interested audio source signal from the input mixed signals in the time-frequency domain, and supplies the vector. The noise signal generation module generates the mixed noise signal by cancelling the interested audio source signal from the input mixed signals by using the interested audio source cancellation vector set by the interested audio source cancellation vector generation module. The mask generation module generates the binary mask according to the energy ratio between the mixed noise signal generated by the noise signal generation module and the input mixed signals and supplies the binary mask.

[Cluster-Based Loss Characteristic Recovering Method]

The operations of the cluster-based loss feature recovering unit 108 will be described. The loss feature recovering unit recovers loss features with respect to the interested audio source by using the binary mask generated by the mask generation unit and the input mixed signals and, particularly, recovers the loss features with respect to the interested audio source based on clusters.

In general, an audio signal affected by noise may be represented by a log spectrum signal in the time-frequency domain as follows.

$$Y(l,k) = X(l,k) + N(l,k)$$ [Mathematical Formula 31]

In the above Mathematical Formula 31, Y(l,k), X(l,k), and N(l,k) represent log spectrum components of an observation signal, an audio signal which is not affected by noise, and a noise signal at an l-th frame in a k-th frequency band, respectively.

Herein, it is assumed that a vector of Y(l,k) of which value is strongly affected by noise and is determined as an unreliable component is denoted by Y(l,k) and a vector of Y(l,k) of which value is weakly affected by noise and is determined as a reliable component is denoted by Y(l,k).

When Y(l,k) which is weak affected by noise is given, an approximate value suitable to $X_r(l,k)$ included in the component can be considered to be $Y_r(l,k)$. However, since $X_u(l,k)$ included in $Y_u(l,k)$ is very strongly affected by $N_u(l,k)$, $X_u(l,k)$ cannot be easily estimated. However, by taking into consideration the log spectrum component, constraints expressed by Mathematical Formula 32 can be assumed.

$$X_r(l,k) = Y_r(l,k)$$

$$X_u(l,k) \le Y_u(l,k)$$ [Mathematical Formula 32]

The methods employing the loss feature recovering technique using the above-described features may be classified mainly into two types.

The first method is marginalization as a representative approach of recognition system correction. In the method, recognition is performed by estimating the probability with respect to the unreliable component in an HMM (Hidden Markov Model)-based voice recognition system as a marginal probability distribution value. Namely, when an observation vector Y which is affected by noise at an arbitrary frame is given, if it is assumed that a vector X for voice configured with a reliable component $X_r$ and an unreliable component $X_u$ according to given constraints is included in the observation vector, an output probability of the observation vector X for the given voice at the current state s in the voice recognition system can be expressed by Mathematical Formula 33.

[Mathematical Formula 33]

$$P(X \mid s) = P(X_r = Y_r, -\infty \le X_u \le Y_u \mid s)$$

$$= \prod_{j \in R} \frac{1}{\sqrt{2\pi}\, \sigma_s(j)} e^{-\frac{(X(j)-\mu_X(j))^2}{2\sigma_s^2(j)}} \times$$

$$\prod_{i \in U} \int_{-\infty}^{Y(i)} \frac{1}{\sqrt{2\pi}\, \sigma_s(i)} e^{-\frac{(X-\mu_X(i))^2}{2\sigma_s^2(i)}} dx$$

In the above Mathematical Formula 33, $Y_r$ and $Y_u$ denote a vector of reliable components and a vector of unreliable components of the observation vector Y, respectively; $X_r$ and $X_u$ denote corresponding portions of an inherent audio signal which is not affected by noise; and X denotes the inherent audio signal vector where $X_r$ and $X_u$ are combined. R and U denote an index set of the reliable vector components and an index set of the unreliable vector components, respectively; Y(j) denotes the j-th component of the observation vector Y; and $\sigma_s^2(j)$ and $\mu_s(j)$ denote variance and average of the j-th index in the gaussian distribution according to the current state s.

Although the recognition system correction method may be an intuitive, reasonable method for performing robust voice recognition using a log spectrum model for a noise voice, since the recognition system and the features need to be directly correlated, it is difficult to use cepstrum features, so that there is a problem in that basic recognition performance is deteriorated.

The second method is a cluster-based loss feature recovering method as a representative approach of feature compensation. A basic assumption of this method is that spectrum vectors of the frame are independent of each other in the time-frequency domain. Under this assumption, the unreliable components are recovered by using correlation between the components in one spectrum vector. In order to perform this, first, the gaussian mixture model distribution described above is obtained from the training data obtained in a noiseless environment.

[Mathematical Formula 34]

$$P(X) = \sum_v c_v \frac{1}{\sqrt{(2\pi)^d |\Theta_v|}} \exp\left(-\frac{1}{2}(X-\mu_v)^T \Theta_v^{-1}(X-\mu_v)\right)$$

In the above Mathematical Formula 34, P(X) denotes the gaussian mixture model distribution; v denotes the dimension of the vector; and $\sigma_v$, $\mu_v$, and $\Theta_v$ denote a weighting factor, an average vector, and a covariance matrix of a v-th gaussian distribution, respectively. The parameters of the distribution are trained from the training data through an EM (Expectation Maximization) algorithm.

If the gaussian mixture model is determined, when a spectrum vector Y including unreliable components is given, the following calculation processes are performed in order to find the inherent audio signal vector X which is not affected by noise. First, $X_r$ is set to be equal to the reliable component $Y_r$, and the estimation value of the $X_u$ corresponding to the unreliable component $Y_u$ is obtained by using a bounded MAP estimation method according to Mathematical Formula 35.

[Mathematical Formula 35]

$$\hat{X}_u = \underset{X_u}{\operatorname{argmax}} P(X_u \mid X_r = Y_r, X_u \leq Y_u)$$

This is obtained by repeating the following processes.

(1) First, the to-be-estimated $\overline{X}(k)$ is initialized by using $\overline{X}(k) = Y(k), \forall k$.

(2) Each $X(i), i \in U$ is calculated according to Mathematical Formula 36.

[Mathematical Formula 36]

$$\tilde{X}(k) = \underset{X(k)}{\operatorname{argmax}} P(X(k) \mid X(i) = \overline{X}(i), i \neq k)$$
$$= \mu(k) + \frac{1}{\sigma^2(k)} \Theta_{X(k),\overline{X}}(\overline{X} - \overline{\mu})$$
$$\overline{X}(k) = \min(\tilde{X}(k), Y(k))$$

In the above Mathematical Formula 36, $\overline{X}$ denotes a vector having $X(i), i \in U$ as components, and $\mu$ denotes an average of $\overline{X}$. In addition, $\mu(k)$ and $\sigma^2(k)$ denote average and variance of X(k), and $\Theta_{X(k),\overline{X}}$ denotes a row vector representing covariance between X(k) and $\overline{X}$.

(3) Until X(k) converges, the above step (2) is repeated, and finally, $\hat{X}_u$ becomes a converged $\overline{X}(i), i \in U$.

However, since it is difficult to directly estimate $\hat{X}_u$ through the gaussian mixture model, $\hat{X}_u$ is approximated to a linear combination of conditional bounded MAP estimation values for the gaussian.

[Mathematical Formula 37]

$$\hat{X}_u = \sum_v P(v \mid X_r, X_u \leq Y_u) \hat{X}_u^v$$

[Mathematical Formula 38]

$$\hat{X}_u^v = \underset{X_u}{\operatorname{argmax}} P(X_u \mid X_r = Y_r, X_u \leq Y_u; \mu_v, \Theta_v)$$

[Mathematical Formula 39]

$$P(v \mid X_r, X_u \leq Y_u) = \frac{c_v P(X_r, X_u \leq Y_u \mid v)}{\sum_j c_j P(X_r, X_u \leq Y_u \mid j)}$$

[Mathematical Formula 40]

$$P(X_r, X_u \leq Y_u \mid v) = P(X_r, -\infty \leq X_u \leq Y_u; \mu_v, \Theta_v)$$
$$= \prod_{j \in R} \frac{1}{\sqrt{2\pi}\, \sigma_v(j)} e^{-\frac{(X(j)-\mu_v(j))^2}{2\sigma_v^2(j)}} \times$$
$$\prod_{i \in U} \int_{-\infty}^{Y(i)} \frac{1}{\sqrt{2\pi}\, \sigma_v(i)} e^{-\frac{(X-\mu_v(i))^2}{2\sigma_v^2(i)}} dx$$

In the above Mathematical Formulas 37 to 40, $\hat{X}_u$ is a component of unreliable output features obtained through the above-described algorithm; $Y_r$ and $Y_u$ denote a vector of reliable components and a vector of unreliable components of the observation vector Y, respectively; $X_r$ and $X_u$ denote portions of corresponding portions of an inherent audio signal which is not affected by noise; R and U denote an index set of the reliable vector components and an index set of the unreliable vector components, respectively; X(j) and Y(j) denote the j-th component of the audio signal vector X and the j-th component of the observation vector Y, respectively; $\sigma_v$, $\mu_v$, and $\Theta_v$ denote a weighting factor, an average vector, and a covariance matrix of a v-th gaussian distribution, respectively; $\sigma_v^2(j)$ and $\mu_v(f)$ denote variance and average of the j-th index in the v-th gaussian distribution, respectively; $Y_r$ and $Y_u$ denote a vector of reliable components and a vector of unreliable components of the observation vector Y, respectively; $X_r$ and $X_u$ denote portions of corresponding portions of an inherent audio signal which is not affected by noise; X denotes the inherent audio signal vector where $X_r$ and $X_u$ are combined; R and U denote an index set of the reliable vector components and an index set of the unreliable vector components, respectively; and $\sigma_v^2(j)$ and $\mu_v(f)$ denote variance and average of the j-th index in the gaussian distribution according to the current state v.

The post probability of each gaussian model is obtained by using the parameters of the gaussian mixture model which is trained from the training data through an EM algorithm and a bounded MAP estimation method as expressed by the Mathematical Formula 37, and the loss feature is recovered through superposition thereof.

The cluster-based loss feature recovering method is simpler than the covariance-based loss feature recovering method, so that the cluster-based loss feature recovering method requires a small amount of the training data and shows effective recovering performance.

In addition, unlike the recognition system correction method, the feature recovering method can be implemented separately from the recognition system, and thus, cepstrum can be freely used without burden of correction of the recognition system, so that the feature recovering method shows robust recognition performance without deterioration in basic recognition performance.

[MFCC Conversion]

The interested audio source of which cluster-based loss feature is recovered as described above is input to the MFCC conversion unit 110.

The MFCC conversion unit 110 performs MFCC conversion by converting the input feature information of the interested audio source in a spectrum domain by using cepstrum.

[Voice Recognition]

The MFCC-converted feature information is input to the voice recognition unit 112. The voice recognition unit 112 performs voice recognition according to the MFCC-converted feature information.

Evaluation of the performance according to the present invention described above will be described.

[Test Environment and Performance Evaluation Standard]

Figure 6:
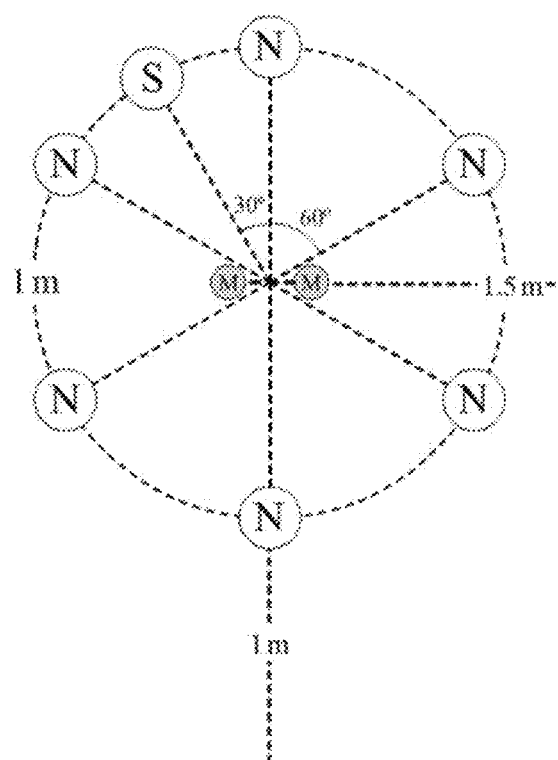
FIG. 6 is a schematic diagram illustrating a room environment for an interested audio source cancellation test according to an exemplary embodiment of the present invention.

FIG. 6 is a schematic diagram illustrating a set for evaluation of the present invention.

A voice recognition set of RM database is used to perform the evaluation of the present invention. Simulation is obtained by mixing a test audio source and noises of the database through n indoor impact response model. For the noise signals, babble noises X, that is, voices which are clamorously spoken by many people are used. The room has a size of 4 m (width), 5 m (length), and 3 m (height), and the microphones are located at the positions are located at positions of 2.5 m (longitudinal) and 2 (transverse) which are separated by 20 cm and are denoted by M. The audio source is located at the position of 30° leftwards which is separated by 1 m from the center of the two microphones and is denoted by S. Noises are located at positions of 0°, 60°, 120°, 180°, 240°, and 300° separated by 1 m from the center of the two microphones and are denoted by N. The noises are babble noises having different forms, and different babble noises are mixed randomly to each audio source. The mixed input signals are tested through several methods. Each input signal is tested by using four SNRs of 0 dB, 5 dB, 10 dB, and 20 dB and setting the reverberation time RT60 to 0.1 sec, 0.3 sec, and 0.5 sec.

[Interested Audio Source Cancellation Experiment]

Figure 7:
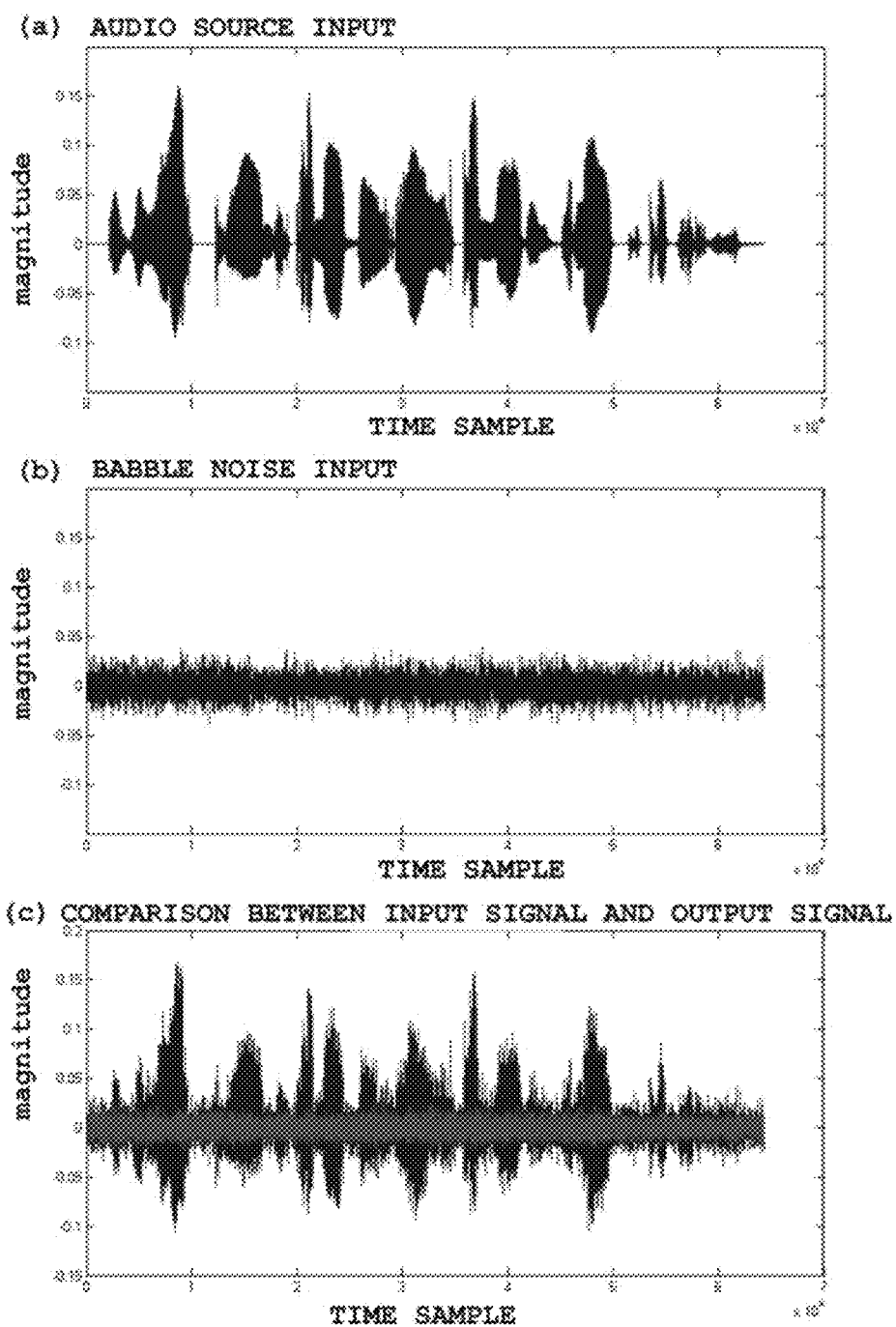
FIG. 7 is a diagram illustrating an interested audio source, a noise signal, and an interested audio source cancellation output signal.

FIG. 7 illustrates a signal having an input SNR of 5 dB among test signals. FIG. 7(*a*) illustrates a waveform of an audio source signal, and FIG. 7(*b*) illustrates a waveform of a noise signal. In FIG. 7(*c*), a blue waveform is a waveform of an input signal, and a red waveform is a waveform of an output signal.

AS illustrated in FIG. 7(*c*), an output waveform is configured with noise signals obtained by cancelling the audio source signal from the input waveform.

FIG. 8 is a table listing average of output SNR values according to input SNR and reverberation time. As listed in the table of FIG. 8, the output SNR is considerably reduced in comparison with the input SNR, which means that the intensity of the audio source signal in the output signal is greatly reduced and only the noise signal is output. Therefore, it is possible to cancel the interested audio source according to the present invention.

[Voice Recognition Test]

FIG. 9 is a table listing output signals obtained through the interested audio source cancellation algorithm according to the present invention and results of the voice recognition performed by recovering the cluster-based loss features with respect to the output obtained by passing input signals through an OIR mask obtained from the input signals and using an HMN-based voice recognition apparatus.

Baselines represent the results of voice recognition which is performed by using only the input signals without use of the interested audio source cancellation algorithm according to the present invention. The results of voice recognition are improved with respect to any input SNR and any reverberation time through the interested audio source cancellation algorithm according to the present invention. It can be understood from the results that the performance of the voice recognition can be improved through the interested audio source cancellation algorithm.

As a result of the test described above, the algorithm of cancelling the interested audio source or recognizing the interested audio source signal by using the interested audio source cancellation algorithm based on the independent vector analysis according to the present invention, the OIR mask, and the cluster-based loss feature recovering method using the OIR mask can effectively cancel the interested audio source by using only the two microphones in various signal-to-noise ratio environments and various reverberation environment and even in an environment where much more noise sources exist than the microphones. In addition, when the voice recognition is performed by using the algorithm, the better performance of the voice recognition can be obtained as a result.

The present invention includes a computer-readable recording medium recording a program for implementing the above-described interested audio source cancellation method and the voice recognition method using the same.

The invention claimed is:

1. An interested audio source cancellation method, comprising steps of:

receiving input mixed signals from two microphones and transforming the input mixed signals into a time-frequency domain through short-term Fourier transformation;

setting an interested audio source cancellation vector for cancelling an interested audio source signal from the input mixed signals in the time-frequency domain; and generating a noise signal by cancelling the interested audio source signal from the input mixed signals by using the interested audio source cancellation vector, wherein the interested audio source cancellation vector is trained in order to extract the noise signal in such a way that the noise signal has a distribution approaching a gaussian distribution.

2. The interested audio source cancellation method according to claim 1, wherein the interested audio source cancellation vector is trained according to Mathematical Formulas 41 and 42, and $$\Delta w(k) \propto E\{z(k,\tau)[(w(k))^H z(k,\tau)]^* g(\tau|(w(k))^H z(k,\tau)|^2)\} \quad \text{[Mathematical Formula 41]}$$

$$w(k) \leftarrow w(k)/\|w(k)\| \quad \text{[Mathematical Formula 42]}$$

wherein, in the Mathematical Formulas 41 and 42, w denotes a vector for cancelling an interested audio source signal; z denotes a whitened input vector; k denotes a frequency index; and g denotes a function obtained by differentiating a nonlinear function G.

3. The interested audio source cancellation method according to claim 1,
wherein the interested audio source cancellation vector is initialized by using a DUET histogram according to Mathematical Formula 43, and $$w(k) = \frac{1}{\sqrt{1+a^2(k)}} \begin{bmatrix} 1 \\ -A^{-1}(k) \end{bmatrix}$$ [Mathematical Formula 43]

wherein, in the Mathematical Formula 43, w denotes a vector for cancelling the interested audio source signal; a and δ denote attenuation and time delay parameters with respect to the interested audio source; $A(k)= a(k)e^{-iw_k\delta(k,\tau)}$; and $w_k$ denotes a normalized frequency in a k-th frequency domain.

4. The interested audio source cancellation method according to claim 3, wherein the DUET histogram is two-dimensionally filtered through a two-dimensional gaussian window.

5. The interested audio source cancellation method according to claim 1, wherein the interested audio source cancellation vector is trained by minimizing a negentropy in order to extract the noise signal which is closer to the gaussian distribution.

6. A voice recognition method using signals input from two microphones, comprising steps of:
(a) generating a noise signal by using input mixed signals supplied from two microphones and generating a binary mask according to energy ratios between the noise signal and the input mixed signals;
(b) recovering loss features with respect to an interested audio source by using the binary mask and the input mixed signals; and
(c) performing voice recognition by using a result of the recovering of the loss features with respect to the interested audio source.

7. The voice recognition method according to claim 6, wherein the step (a) includes steps of:
(a1) receiving the input mixed signals from the two microphones and transforming the signals into a time-frequency domain through short-term Fourier transformation;
(a2) setting an interested audio source cancellation vector for cancelling an interested audio source signal from the input mixed signals in the time-frequency domain;
(a3) generating a mixed noise signal by cancelling the interested audio source signal from the input mixed signals by using the interested audio source cancellation vector; and
(a4) generating the binary mask according to the energy ratios between the mixed noise signal and the input mixed signals.

8. The voice recognition method according to claim 7, wherein the interested audio source cancellation vector is trained according to Mathematical Formulas 44 and 45, and $$\Delta w(k) \propto E\{z(k,\tau)[(w(k))^H z(k,\tau)]^* g(\tau|(w(k))^H z(k,\tau)|^2)\}$$ [Mathematical Formula 44]

$$w(k) \leftarrow w(k)/\|w(k)\|$$ [Mathematical Formula 45]

wherein, in the Mathematical Formulas 44 and 45, w denotes a vector for cancelling the interested audio source signal; z denotes a whitened input vector; k denotes a frequency index; and g denotes a function obtained by differentiating a nonlinear function G.

9. The voice recognition method according to claim 7, wherein the interested audio source cancellation vector is initialized by using a DUET histogram according to Mathematical Formula 46, and $$w(k) = \frac{1}{\sqrt{1+a^2(k)}} \begin{bmatrix} 1 \\ -A^{-1}(k) \end{bmatrix}$$ [Mathematical Formula 46]

wherein in the Mathematical Formula 46, w denotes an interested audio source cancellation vector for cancelling the interested audio source signal; a and δ denote attenuation and time delay parameters with respect to the interested audio source; $A(k)=a(k)e^{-iw_k\delta(k,\tau)}$; and $w_k$ denotes a normalized frequency in a k-th frequency domain.

10. The voice recognition method according to claim 9, wherein the DUET histogram is two-dimensionally filtered through a two-dimensional gaussian window.

11. The voice recognition method according to claim 6, wherein the step (b) is recovering the loss features of the interested audio source according to Mathematical Formulas 47, 48, 49, and 50, and $$\hat{X}_u = \sum_v P(v \mid X_r, X_u \leq Y_u)\hat{X}_u^v$$ [Mathematical Formula 47]

$$\hat{X}_u^v = \underset{X_u}{\operatorname{argmax}} P(X_u \mid X_r = Y_r, X_u \leq Y_u; \mu_v, \Theta_v)$$ [Mathematical Formula 48]

$$P(v \mid X_r, X_u \leq Y_u) = \frac{c_v P(X_r, X_u \leq Y_u \mid v)}{\sum_j c_j P(X_r, X_u \leq Y_u \mid j)}$$ [Mathematical Formula 49]

$$P(X_r, X_u \leq Y_u \mid v) = P(X_r, -\infty \leq X_u \leq Y_u; \mu_v, \Theta_v)$$
$$= \prod_{j \in R} \frac{1}{\sqrt{2\pi}\,\sigma_v(j)} e^{-\frac{(X(j)-\mu_v(j))^2}{2\sigma_v^2(j)}} \times$$
$$= \prod_{i \in U} \int_{-\infty}^{Y(i)} \frac{1}{\sqrt{2\pi}\,\sigma_v(i)} e^{-\frac{(X-\mu_v(i))^2}{2\sigma_v^2(i)}} dx$$ [Mathematical Formula 50]

wherein, in the Mathematical Formulas 47 to 50, $\hat{X}_u$ is a component of unreliable output features obtained through the above-described algorithm; $Y_r$ and $Y_u$ denote a vector of reliable components and a vector of unreliable components of the observation vector Y, respectively; $X_r$ and $X_u$ denote portions of corresponding portions of an inherent audio signal which is not affected by noise; R and U denote an index set of the reliable vector components and an index set of the unreliable vector components, respectively; X(j) and Y(j) denote the j-th component of the audio signal vector X and the j-th component of the observation vector Y, respectively; $\sigma_v$, $\mu_v$, and $\Theta_v$ denote a weighting factor, an average vector, and a covariance matrix of a v-th gaussian distribution, respectively; $\sigma_v^2(j)$ and $\mu_v(f)$ denote variance and average of the j-th index in the v-th gaussian distribution, respectively; $Y_r$ and $Y_u$ denote a vector of reliable components and a vector of unreliable components of the observation vector Y, respectively; $X_r$ and $X_u$ denote portions of corresponding portions of an inherent audio signal which is not affected by noise; X denotes the inherent audio signal vector where $X_r$ and $X_u$ are combined; R and U denote an index set of the reliable vector components and an index set of the unreliable vector components, respectively; and $\sigma_v^2(j)$ and $\mu_v(f)$ denote variance and average of the j-th index in the gaussian distribution according to the current state v.

12. A voice recognition apparatus for performing voice recognition from signals input from two microphones, comprising:

a signal input unit which receives input signals from the two microphones;

a mask generation unit which is supplied with input mixed signals from the signal input unit, generates a noise signal from the input mixed signals, and generates a binary mask according to energy ratios between the noise signal and the mixed signals;

a loss feature recovering unit which recovers loss features with respect to an interested audio source by using the binary mask generated by the mask generation unit and the input mixed signals; and a voice recognition unit which performs voice recognition by using a result of the recovering of the loss features with respect to the interested audio source through the loss feature recovering unit.

13. The voice recognition apparatus according to claim 12, wherein the mask generation unit is configured to include:

an interested audio source cancellation vector generation module which receives the input mixed signals from the signal input unit to transform the signals into a time-frequency domain through short-term Fourier transformation and sets an interested audio source cancellation vector for cancelling an interested audio source signal from the input mixed signals in the time-frequency domain; and a noise signal generation module which generates a mixed noise signal by cancelling the interested audio source signal from the input mixed signals by using the interested audio source cancellation vector set by the interested audio source cancellation vector generation module; and a mask generation module which generates the binary mask according to the energy ratios between the mixed noise signal generated by the noise signal generation module and the input mixed signals.

14. The voice recognition apparatus according to claim 13, wherein the interested audio source cancellation vector generation module trains and sets the interested audio source cancellation vector according to Mathematical Formulas 44 and 45, and $$\Delta w(k) \propto E\{z(k,\tau)[(w(k))^H z(k,\tau)]^* g(\tau|(w(k))^H z(k,\tau)|^2)\} \quad \text{[Mathematical Formula 44]}$$

$$w(k) \leftarrow w(k)/\|w(k)\| \quad \text{[Mathematical Formula 45]}$$

wherein, in the Mathematical Formulas 44 and 45, w denotes a vector for cancelling the interested audio source signal; z denotes a whitened input vector; k denotes a frequency index; and g denotes a function obtained by differentiating a nonlinear function G.

15. The voice recognition apparatus according to claim 13, wherein the interested audio source cancellation vector generation module initializes the interested audio source cancellation vector by using a DUET histogram according to Mathematical Formula 46, and $$w(k) = \frac{1}{\sqrt{1+a^2(k)}} \begin{bmatrix} 1 \\ -A^{-1}(k) \end{bmatrix} \quad \text{[Mathematical Formula 46]}$$

wherein in the Mathematical Formula 46, w denotes an interested audio source cancellation vector for cancelling the interested audio source signal; a and δ denote attenuation and time delay parameters with respect to the interested audio source; $A(k)=a(k)e^{-iw_k\delta(k,\tau)}$; and $w_k$ denotes a normalized frequency in a k-th frequency domain.

16. The voice recognition apparatus according to claim 15, wherein the DUET histogram is two-dimensionally filtered through a two-dimensional gaussian window.

17. The voice recognition apparatus according to claim 12, wherein the loss feature recovering unit recovers loss features of the interested audio source based on clusters by using Mathematical Formulas 47, 48, 49, and 50, and $$\hat{X}_u = \sum_v P(v \mid X_r, X_u \le Y_u) \hat{X}_u^v \quad \text{[Mathematical Formula 47]}$$

$$\hat{X}_u^v = \underset{X_u}{\text{argmax}} \, P(X_u \mid X_r = Y_r, X_u \le Y_u; \mu_v, \Theta_v) \quad \text{[Mathematical Formula 48]}$$

$$P(v \mid X_r, X_u \le Y_u) = \frac{c_v P(X_r, X_u \le Y_u \mid v)}{\sum_j c_j P(X_r, X_u \le Y_u \mid j)} \quad \text{[Mathematical Formula 49]}$$

$$P(X_r, X_u \le Y_u \mid v) = P(X_r, -\infty \le X_u \le Y_u; \mu_v, \Theta_v) \quad \text{[Mathematical Formula 50]}$$
$$= \prod_{j \in R} \frac{1}{\sqrt{2\pi}\, \sigma_v(j)} e^{-\frac{(X(j)-\mu_v(j))^2}{2\sigma_v^2(j)}} \times$$
$$= \prod_{i \in U} \int_{-\infty}^{Y(i)} \frac{1}{\sqrt{2\pi}\, \sigma_v(i)} e^{-\frac{(X-\mu_v(i))^2}{2\sigma_v^2(i)}} dx$$

wherein, in the Mathematical Formulas 47 to 50, $\hat{X}_u$ is a component of unreliable output features obtained through the above-described algorithm; $Y_r$ and $Y_u$ denote a vector of reliable components and a vector of unreliable components of the observation vector Y, respectively; $X_r$ and $X_u$ denote portions of corresponding portions of an inherent audio signal which is not affected by noise; R and U denote an index set of the reliable vector components and an index set of the unreliable vector components, respectively; X(j) and Y(j) denote the j-th component of the audio signal vector X and the j-th component of the observation vector Y, respectively; $\sigma_v$, $\mu_v$, and $\Theta_v$ denote a weighting factor, an average vector, and a covariance matrix of a v-th gaussian distribution, respectively; $\sigma_v^2(j)$ and $\mu_v(f)$ denote variance and average of the j-th index in the v-th gaussian distribution, respectively; $Y_r$ and $Y_u$ denote a vector of reliable components and a vector of unreliable components of the observation vector Y, respectively; $X_r$ and $X_u$ denote portions of corresponding portions of an inherent audio signal which is not affected by noise; X denotes the inherent audio signal vector where $X_r$ and $X_u$ are combined; R and U denote an index set of the reliable vector components and an index set of the unreliable vector components, respectively; and $\sigma_v^2(j)$ and $\mu_v(f)$ denote variance and average of the j-th index in the gaussian distribution according to the current state v.

* * * * *